(No Model.)
A. EVANS & J. DRAPER.
CULTIVATOR.
No. 250,512. Patented Dec. 6, 1881.
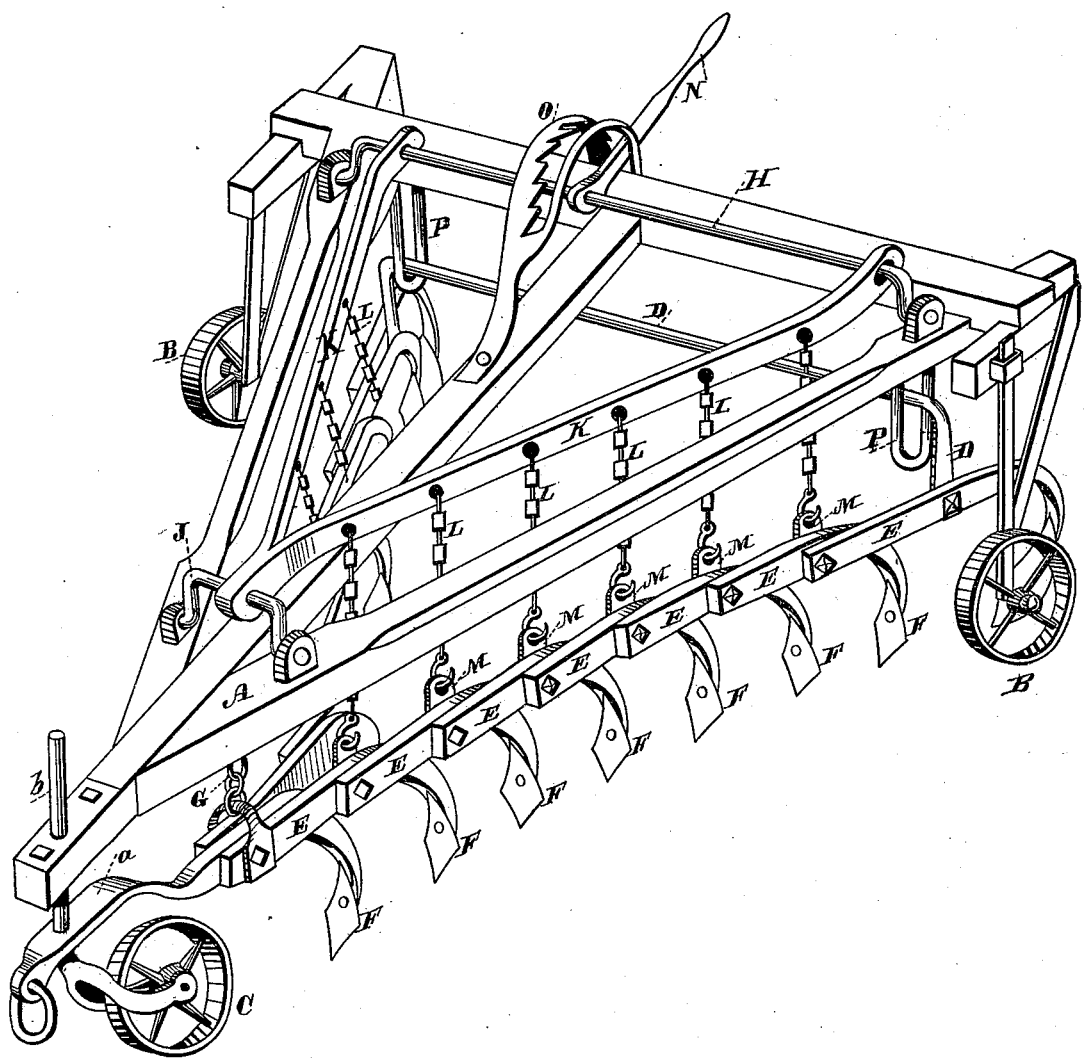
Witnesses
Geo. H. Strong
Frank A. Brooks
Inventors
Aaron Evans 2nd
James Draper
By Dewey & Co.
Attys

UNITED STATES PATENT OFFICE.

AARON EVANS AND JAMES DRAPER, OF ST. JOHN, CALIFORNIA.

CULTIVATOR.

SPECIFICATION forming part of Letters Patent No. 250,512, dated December 6, 1881.

Application filed June 14, 1881. (No model.)

*To all whom it may concern:*

Be it known that we, AARON EVANS and JAMES DRAPER, of St. John, county of Colusa, State of California, have invented an Improved Cultivator; and we hereby declare the following to be a full, clear, and exact description thereof.

Our invention relates to that class of agricultural implements known as "cultivators;" and it consists in the following construction and arrangement of the several parts, and which will be hereinafter fully described, and the points of novelty set forth in the claim.

The drawing represents a perspective view of a device embodying our invention.

Let A represent the body or frame of the implement, having two rear wheels, B, and a guiding-wheel, C, properly journaled in front, as shown.

To the rear of the frame A, under the side timbers, are secured the elongated staples P, through which loosely fits the transverse shaft or rod D. It will be seen that the rod D may be moved up or down, the limit of its vertical play being defined by the staples P. The rod D has its ends turned downwardly and flattened, as shown, to allow the cultivator-arms to be pivoted thereto, as hereinafter shown.

Let E represent the cultivator arms or beams, having curved rear portions, as shown, to the ends of which are secured the diamond-shaped plows or shovels F. The rear arms E are pivoted at or about their center to the end of the rod D, and their forward ends are pivoted at or about the center of the arms immediately in front, and the ends of these arms are each pivoted similarly to the next preceding arm, and so on to the front in converging lines or series, as shown. The ends of the two foremost arms are pivoted at or about the center of the leading arm, which said arm has a forwardly-extending shank (marked *a)* fitting loosely around the standard *b* of the guiding-wheel C, and adapted to have a vertical play upon said standard, the extent of which is defined by the bottom of the standard and the frame above or a washer placed under the frame. The standard *b* serves as a guide for the forward arm E. The forward ends of these series formed of successive arms are supported from the frame by means of a chain, G, attached to the arms and to the frame A. It will be seen that each of these arms E is independent of the others, and when meeting any obstruction is adapted to rise about its pivot-point, and yet allow the other shovels or cultivator-points to remain in position. Each arm, being separate, is easily removable for repair or the substitution of another.

In order to vary the depth of the shovels or plows, and to change their inclination when required, we have the following means:

Upon the top of the frame A, at the rear, is a crank-shaft, H, having its ends journaled appropriately, and in the front of the frame is a similar though smaller crank-shaft, J.

K K are connecting-arms having their rear ends loosely fitting the crank-shaft H, thence proceeding forward, and converging to meet in one piece, which is loosely fitted upon the small crank-shaft J.

To the arms K K are attached the upper ends of chains L, the other ends of which are attached either to strips M or directly to the arms, and which are secured to the arms E at their pivot-points, as shown.

N is a lever attached to the crank-shaft H, and engaging with a curved rack, O, upon the frame A. By operating the lever N the entire series of arms E may be elevated or lowered.

It is obvious that by using different lengths of chains one end or portion of the series of arms E may be raised or lowered more or less than the other. In thus raising or lowering the series of arms the shaft or rod D has a vertical play in the staples P, and the leading arm moves up and down upon the standard of the guiding-wheel C.

Having thus described our invention, what we claim as new, and desire to secure by Letters Patent, is—

A cultivator comprising two series of diverging independent arms, E, having their forward ends each pivoted at or about the center of the next preceding one, the front central arm E having a shank extending forward and secured to the shaft *b,* upon which it has vertical play, the rigid arm D, connecting the two series of arms, the guides P, the diverging bars K, the crank-arms J and H, the lever N, and the series of independent chains L, one for each arm E, the whole constructed so as to act in combination in the manner and for the purpose set forth.

In witness whereof we have hereunto set our hands.

AARON EVANS.
JAMES DRAPER.

Witnesses:
THOS. SIMMONS,
L. A. McINTOSH.